United States Patent
Eickhoff et al.

(10) Patent No.: US 7,647,145 B2
(45) Date of Patent: Jan. 12, 2010

(54) METHOD FOR ERROR PROCESSING IN ELECTRONIC CONTROLLERS

(75) Inventors: Jürgen Eickhoff, Walsrode (DE); Klaus Pape, Hannover (DE); Gerhard Ruhnau, Neustadt (DE)

(73) Assignee: WABCO GmbH, Hannover (DE)

( * ) Notice: Subject to any disclaimer, the term of this patent is extended or adjusted under 35 U.S.C. 154(b) by 501 days.

(21) Appl. No.: 10/568,047

(22) PCT Filed: Jul. 15, 2004

(86) PCT No.: PCT/EP2004/007857

§ 371 (c)(1),
(2), (4) Date: Oct. 3, 2006

(87) PCT Pub. No.: WO2005/040949

PCT Pub. Date: May 6, 2005

(65) Prior Publication Data

US 2007/0162782 A1    Jul. 12, 2007

(30) Foreign Application Priority Data

Sep. 25, 2003  (DE) ................. 103 44 460

(51) Int. Cl.
*G05B 23/02*  (2006.01)
*G07C 5/08*   (2006.01)

(52) U.S. Cl. ............. 701/29; 701/30; 701/31; 701/34; 701/35; 701/36; 340/438; 340/457

(58) Field of Classification Search .......... 123/397; 701/29, 107, 30, 31, 34, 35, 36; 714/4
See application file for complete search history.

(56) References Cited

U.S. PATENT DOCUMENTS

| | | | |
|---|---|---|---|
| 4,502,446 A * | 3/1985 | Kanegae et al. | 123/479 |
| 4,525,782 A | 6/1985 | Wohlfarth et al. | |
| 5,521,818 A * | 5/1996 | Palansky et al. | 701/62 |
| 5,524,078 A | 6/1996 | Kolb et al. | |
| 5,671,141 A * | 9/1997 | Smith et al. | 701/29 |
| 6,012,004 A * | 1/2000 | Sugano et al. | 701/33 |
| 6,112,150 A * | 8/2000 | Irons et al. | 701/114 |
| 6,876,908 B2 | 4/2005 | Crämer et al. | |
| 2004/0090323 A1 | 5/2004 | Bieringer et al. | |

FOREIGN PATENT DOCUMENTS

| | | |
|---|---|---|
| DE | 31 10774 C2 | 12/1989 |
| DE | 40 40 927 A1 | 6/1992 |
| DE | 44 00 203 C1 | 8/1995 |
| DE | 41 18 692 C2 | 3/2002 |
| DE | 100 56 565 A1 | 8/2002 |
| DE | 101 55 228 A1 | 5/2003 |
| DE | 101 48 214 C2 | 7/2003 |
| FR | 2 756 050 | 11/1996 |

* cited by examiner

*Primary Examiner*—Khoi Tran
*Assistant Examiner*—Dale Moyer
(74) *Attorney, Agent, or Firm*—Kramer Levin Naftalis & Frankel LLP

(57) ABSTRACT

A method for error processing in electronic controllers, particularly, in motor vehicles, is provided whereby errors determined on each vehicle start are permanently written in an error memory. On repeated recognition of similar errors, an error counter, provided for the error, is increased. In the case where it is determined that the error counter has reached a pre-determined state on a renewed vehicle start, a special "poor maintenance" is launched, which only permits the start of the monitored function when further tests are carried out and completed.

4 Claims, 1 Drawing Sheet

METHOD FOR ERROR PROCESSING IN ELECTRONIC CONTROLLERS

BACKGROUND OF THE INVENTION

The present invention relates to an improved method for treating errors in electronic control units, especially in motor vehicles.

The electronic devices contained in modern motor vehicles, such as electronic engine controllers, anti brake-lock systems, stability controls, etc., relate to applications that are critical to safety. This means that the vehicle can be exposed to dangerous situations in the event of a malfunction of the control unit or of the components associated therewith.

The control units must therefore function reliably and must be continuously monitored for fault-free operation. Such monitoring must cover both the control unit itself and the associated peripherals, such as connected sensors, actuators and solenoid valves as well as the cabling thereof.

In modern electronics equipped with microcontrollers, such monitoring is largely ensured by self-tests.

In the case of anti brake-lock systems (ABS), for example, tests known as static tests are performed for cable breaks and short circuits as soon as the ignition is turned on. When the vehicle starts to move, all wheel-speed sensors are then checked for functional capability and compliance with limit values. During driving, further tests are initiated by the microcontrollers contained in the electronics.

By this conventional self-diagnosis, the control units of the various systems installed in the vehicle are capable of recognizing errors and reacting appropriately to them. The detected errors are also stored in memory together with information such as error type, error frequency and boundary conditions, such as the temperature prevailing at the time. Subsequently, these data can be retrieved using a tester connected to the vehicle bus, thus greatly facilitating error elimination and repair.

Simple errors may also be indicated directly inside the vehicle by means of an error light.

Technical features of self-diagnosis of electronic control units in motor vehicles are described in "Self-diagnosis of electronic control units in motor vehicles" [in German], VDI-Berichte No. 612, 1986, pages 361 to 373.

If an error is detected by the foregoing tests during driving, the control unit may react to it in various ways.

For example, an emergency-operation program that permits limited functioning of the faulty unit may be started.

Critical errors are generally indicated directly to the operator by a warning light. In this way the driver is prompted to have the error repaired as soon as possible.

In response to these critical errors, the control unit may even disable part of its own operation as an emergency measure, for example by disconnecting an output stage, in order to prevent incorrect reactions that may be dangerous for the vehicle.

It is also important to ascertain whether the error is of static or sporadic nature. Static errors can be newly recognized by the electronic check at the start of every trip. In contrast, sporadic errors occur only now and then. They can be caused, for example, by an intermittent contact. Both types of errors are stored in the error memory mentioned hereinabove.

If, after a single occurrence or prolonged sporadic occurrence, an error is no longer detectable for a relatively long time, the error in question can also be deleted from the error memory. Under these circumstances, it is assumed that, for example, an intermittent contact is no longer present, or that a different error has since been repaired but has inadvertently not been deleted from the error memory.

DE 4118692 C2 describes the use of an error-time counting device to store the respective time interval in which an error is present. Such an error is then permanently input into an error memory when it is present over more test-time intervals than specified for that error.

An existing error is newly recognized by the error test described in DE 4118692 C2 whenever the vehicle ignition is turned on. Each time, therefore, the electronics assume that the vehicle is error-free. In contrast, no record is kept of whether a static error already present in the error memory will always be newly recognized over a prolonged time period. This is the case if, after an error has occurred or after the error light has turned on, the vehicle operator does not seek to repair the error as soon as possible, even though the operator is actually presumed to have done so.

Unfortunately, such behavior by the vehicle operator leads to increasing problems. Thus multiple errors, whose effects on the vehicle are difficult to foresee, can develop over time. Furthermore, if the poorly maintained electronics in question fail to function in emergencies, the vehicle manufacturer can be exposed to product liability risks. Under these circumstances, it is then difficult for the vehicle manufacturer to prove that the failure of its electronics to function is merely the consequence of lack of maintenance.

SUMMARY OF THE INVENTION

Generally speaking, in accordance with the present invention for cases of disregard of an error indication, such as a warning light, an improved method for treating errors in vehicle control electronics is provided that precludes incorrect functioning of the electronics in question and serious consequential damage that can be caused thereby.

Still other objects and advantages of the present invention will in part be obvious and will in part be apparent from the specification.

The present invention accordingly comprises the various steps and the relation of one or more of such steps with respect to each of the others, and embodies features of construction, combinations of elements, and arrangements of parts which are adapted to effect such steps, all as exemplified in the construction herein set forth, and the scope of the invention will be indicated in the claims.

BRIEF DESCRIPTION OF THE DRAWINGS

The present invention will be described in more detail hereinafter and further advantages will be pointed out on the basis of practical examples with reference to the accompanying drawing, wherein.

DETAILED DESCRIPTION OF THE PREFERRED EMBODIMENTS

Figure 1:
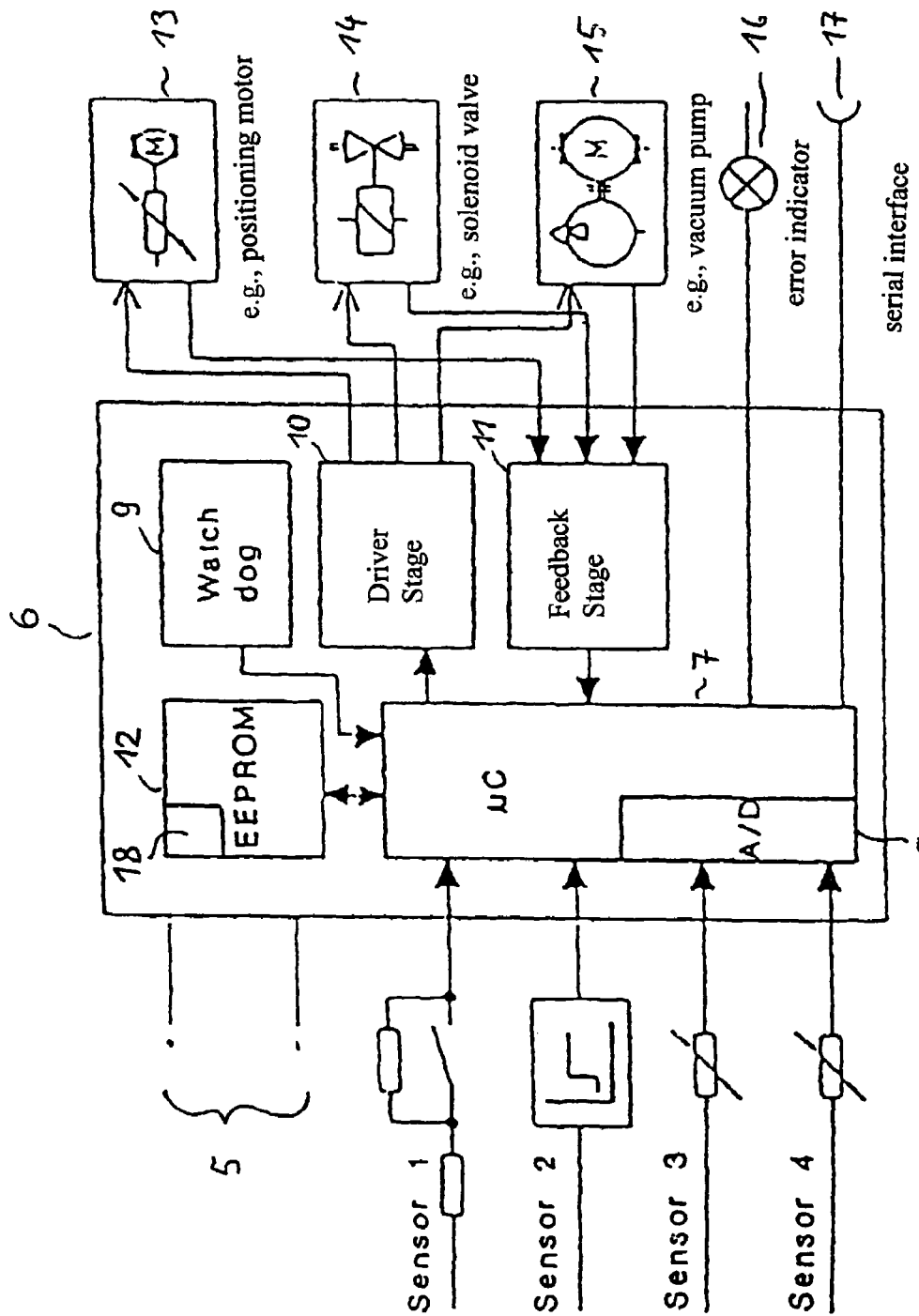
FIG. 1 is a schematic diagram of an electronic control unit of a motor vehicle, shown connected to sensors and actuators, in accordance with a preferred embodiment of the present invention.

Control unit (6) schematically illustrated in FIG. 1 comprises a microcontroller (7) with analog-to-digital (A/D) converter (8), an error memory (12) in the form of an EEPROM connected to microcontroller (7) and containing an error counter (18), a watchdog (9) for checking the run time of microcontroller (7), a driver stage (10) for activating the connected actuators and a feedback stage (11) for communicating feedback data from the actuators.

As depicted in FIG. 1, a positioning motor (13), a solenoid valve (14) and a vacuum pump (15) are connected as actuators to control unit (6). Examples of feedback data include the position of positioning motor (13), the position of solenoid valve (14) and the initial pressure of vacuum pump (15). An error indicator (16) to signal errors to the operator is also connected to microcontroller (7). Moreover, microcontroller (7) is connected to a serial interface (17), via which error data and other data can be read using a special tester. Furthermore, a vehicle data bus can be connected to interface (17) in order to link control unit (6) with the electronics of another vehicle, in order to communicate therewith and, for example, to exchange data used in common.

A voltage supply (5) and sensors (1) to (4) are connected to the input side of control unit (6). Sensors (1) and (2) transmit digital values directly to microcontroller (7), whereas sensors (3) and (4) have analog output signals, which are converted to digital values via analog-to-digital converter (8).

If microcontroller (7) in control unit (6) detects a permanent error when the vehicle starts to move, this error will be written into error memory (12). If the same error recurs when the vehicle next starts to move, the count of an error counter (18) allocated to this error in error memory (12) is incremented in each case. The increment may have a value of 1, but a higher value such as 10 may also be applied in each case.

If, when the vehicle once again starts to move at a later time, it is found that the count of error counter (18) has reached a predetermined value for a particular error, a "poor maintenance" special program takes over within microcontroller (7).

The "poor maintenance" special program then disables starting of the function being checked, such as an anti brake-lock system (ABS), until expanded tests have been performed and passed. Examples of such tests are a dynamic check of all wheel-speed sensors during driving, a dynamic test of the connected solenoid valves or other types of exhaustive tests.

Other kinds of reactions may also be initiated by the "poor maintenance" special program, such as an intensive warning or signal to the driver.

If the full scale of error counter (18) ranges from a count of zero to a count of 250, for example, the "poor maintenance" special program may take over when the count reaches 100.

After the vehicle has been driven for a predetermined time without errors or for a predetermined distance without errors, all or part of the count of error counter (18) is automatically deleted once again.

In the case of partial deletion, the error counter is not reset to zero directly, but instead the count is decremented only by a predetermined fixed value, such as 50 for example. The normal error tests explained above, for example simple tests for cable break, will be reactivated only if the count ultimately reaches zero after the vehicle has started to move several further times without errors.

Generally speaking, the inventive method comprises inferring the state of maintenance of the vehicle from the error count of the vehicle electronics. In the process, if it is determined on the basis of an abnormally high error count that the vehicle has demonstrably been poorly maintained, then intensified tests are required. If these intensified tests and expanded tests are not passed, then for safety reasons the function being checked, such as, for example, an anti brake-lock system (ABS), is completely disconnected. The disconnection will be reported to the vehicle operator by a warning light, so that from that time on the operator can adapt his/her driving technique accordingly.

Although the inventive method has been explained with reference to motor vehicle electronics, it should be appreciated that it can also be applied to any other type of electronics provided with error recognition and storage.

It will thus be seen that the objects set forth above, among those made apparent from the preceding description, are efficiently attained, and since certain changes may be made in the above constructions without departing from the spirit and scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A method for treating errors in an electronic control unit of a vehicle, the electronic control unit being programmed with an error-recognition program and including an error memory for storage of permanent and sporadic errors and an error indicator, the method comprising the steps of:
   writing into the error memory at least one error detected when the vehicle starts to move;
   when the at least one error recurs, incrementing the count of an error counter allocated to the at least one error in the error memory by a preselected amount;
   when the vehicle starts to move on a subsequent occasion, the count of the error counter reaches a preselected value for the at least one error, launching a poor maintenance program; and
   using the poor maintenance program to prevent damage to the vehicle by disabling the start of a vehicle function associated with the at least one error until expanded tests have been performed and passed.

2. The method according to claim 1, further comprising the step of deleting at least one of all and part of the count of the error counter when the vehicle has been driven for at least one of a preselected time and a preselected distance without errors.

3. The method according to claim 2, further comprising the step of decrementing the count of the error counter by a preselected amount when a part of the count of the error counter is deleted.

4. The method according claim 1, further comprising the step of enabling the start of the disabled vehicle function when the count of the error counter reaches zero.

\* \* \* \* \*